April 28, 1931. D. J. MIDDENDORP 1,803,269
APPARATUS FOR MEASURING THE TURBIDITY OF LIQUIDS
Filed Jan. 10, 1929 2 Sheets-Sheet 1

April 28, 1931.   D. J. MIDDENDORP   1,803,269
APPARATUS FOR MEASURING THE TURBIDITY OF LIQUIDS
Filed Jan. 10, 1929   2 Sheets-Sheet 2

D. J. Middendorp
INVENTOR

By: Marks & Clerk
ATTYS.

Patented Apr. 28, 1931

1,803,269

UNITED STATES PATENT OFFICE

DANIËL JOHANNES MIDDENDORP, OF UTRECHT, NETHERLANDS, ASSIGNOR TO WILLIAM PATERSON, OF LONDON, ENGLAND

APPARATUS FOR MEASURING THE TURBIDITY OF LIQUIDS

Application filed January 10, 1929, Serial No. 331,426, and in Great Britain September 4, 1928.

This invention has for its object to devise a simple and effective apparatus for measuring or indicating the turbidity of liquids and utilizes for this purpose the property of light absorption by particles in suspension in the liquid or in solution or in both suspension and solution.

The invention consists in apparatus for measuring or indicating the turbidity of a liquid comprising a plurality of reflectors enclosing the liquid of which the turbidity is to be measured or indicated, means for optically projecting an image onto one of said reflectors and means for observing the number of times said image is directed from one reflector to another through said liquid.

The invention also consists in apparatus for measuring or indicating the turbidity of a liquid comprising a rectangular container for the liquid, nearly parallel mirrors upon opposite sides of said container and each mirror having a transparent portion arranged substantially on the same horizontal level but laterally displaced relatively to one another, and a source of light adjacent to the transparent portion in one of said mirrors.

Further features of the invention will be apparent from the description given hereafter and from the appendant claims.

The accompanying drawings illustrate one convenient form of apparatus for carrying out the invention.

In carrying my invention into effect in one convenient manner I form my improved apparatus with a rectangular or other suitably shaped box, container, or casing $a$ formed from any suitable material or combination of materials, and opposite sides of such container or receptacle I form as, or provide with, mirrors $b$ $c$ which are preferably of silvered glass but which may be formed from any other suitable material.

Figure 1:
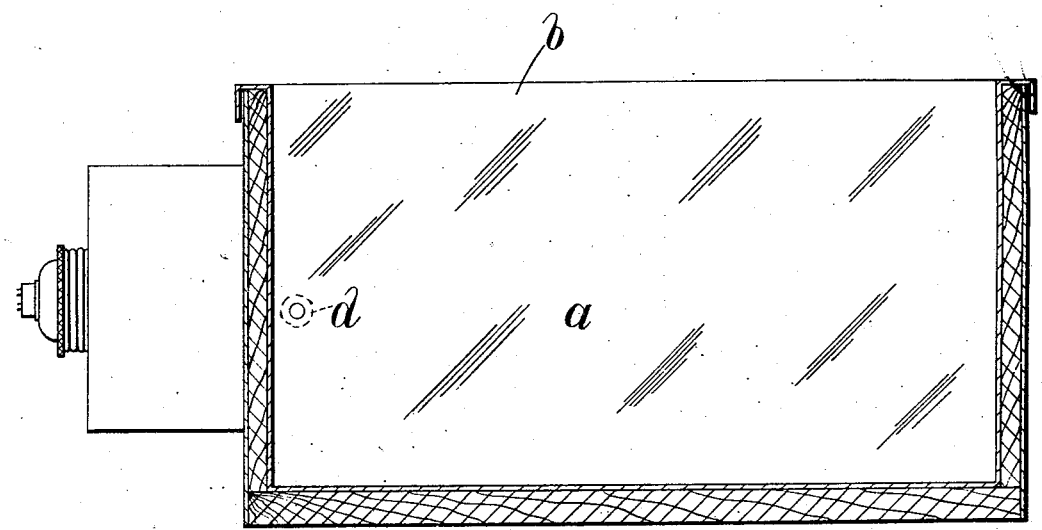
Figure 1 is a longitudinal elevation partly in section.
Figure 2:
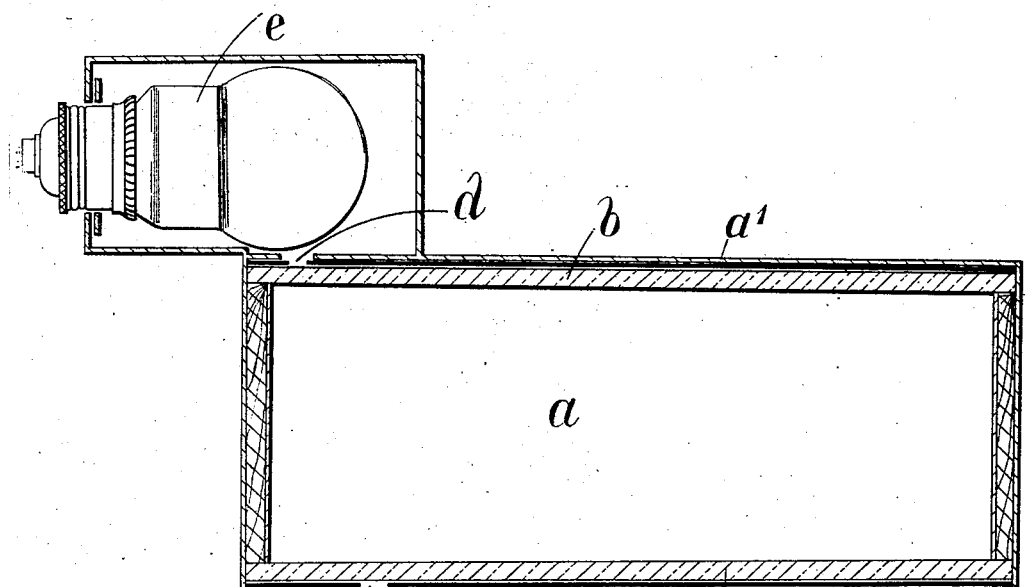
Figure 2 is a plan partly in section.
Figure 3:
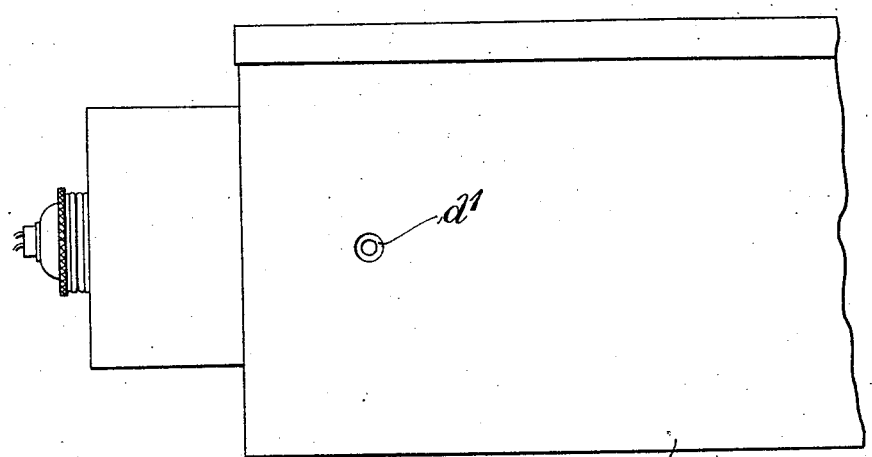
Figure 3 is an outside elevation with a portion broken away.

In one of the mirrors $b$ I form a small transparent portion in the actual reflecting surface (as, for example, by removing a portion of the silvering from the silvered glass) which portion is in register with an aperture $d$ in the outer metal or other wall $a'$ of the container (when such wall is employed apart from the mirror) so that a beam of light from the lamp $e$ may be projected through the liquid contained in the vessel $a$, it being preferred that the bulb of the lamp $e$ shall be of white opalescent glass so that a distinctive image may thereby be formed although it will be understood that any other form of image may be employed for optical projection through the liquid, and such image may be of circular, rectangular, or other suitable shape. A second transparent portion, similar to that above referred to, is formed in the mirror $c$ and is in register with an aperture $d'$ in the outer wall $a'$, the transparent portion in the mirror $c$ being at approximately the same horizontal level as that in the mirror $b$ but being laterally displaced relative thereto as clearly indicated in Figure 2.

Figure 4:
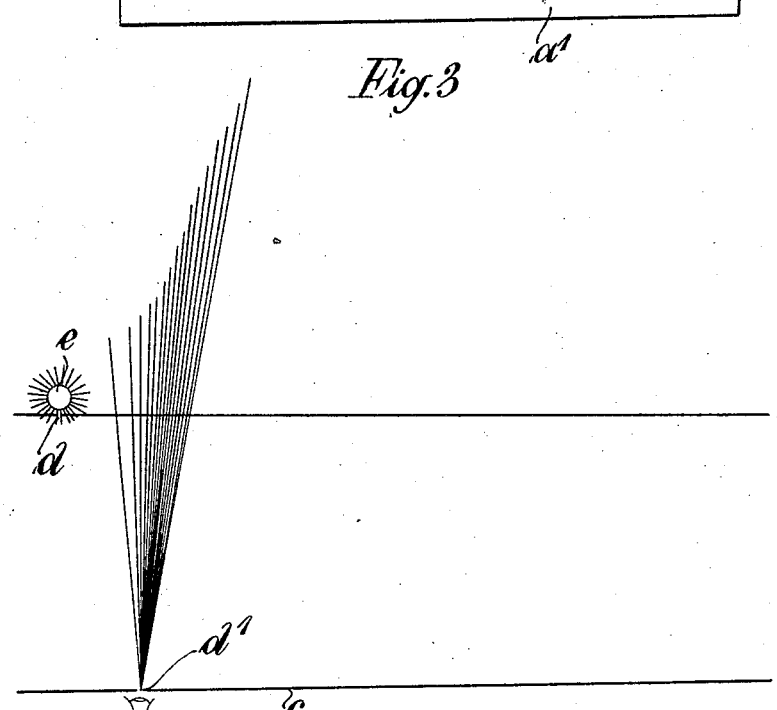
Figure 4 is a diagram illustrating the principle upon which the apparatus operates.

The mirrors $b$ and $c$ are arranged at a slight inclination to one another and it will be evident to those skilled in optics that with such an arrangement of nearly parallel mirrors a succession of virtual images will be formed by successive reflections between the two mirrors, which images will be located upon a circle struck from a centre at the point where the mirrors $b$ and $c$ (if produced) would meet and which will be spaced round the circumference of the circle at points separated by twice the arcual distance between the mirrors $b$ and $c$. Thus an eye viewing the mirror $b$ through the aperture $d'$ will see a series of images in the mirror $b$, which images will be of progressively decreasing size and intensity and will be separated from one another by gradually decreasing distances, and while it is manifestly impossible in the scale adopted for the accompanying drawing to illustrate the locations of the respective images Figure 4 shows in diagram form the portions of the lines of sight joining the eye of the observer to some of the virtual images displayed in the mirror b. If now there be inserted into the container a a quantity of the liquid of which the turbidity is to be measured it will be clear that the number of bright images visible to the eye of the observer will give a measure or indication of the turbidity of the liquid since the greater the turbidity the greater will be the amount of light absorbed in passing through the liquid and therefore the fewer will be the number of images visible to the eye. Such turbidity may be indicated by reference to charts or tables or by means of a suitably calibrated scale which may be provided in conjunction with the apparatus.

The invention is not to be limited to any particular size or shape of container nor to any particular optical means for producing a succession of reflections of an image through the liquid of which the turbidity is to be measured as such details may be varied in accordance with any particular practical requirements that may have to be fulfilled.

Having now described my invention, what I claim as new and desire to secure by Letters Patent, is:—

1. Apparatus for measuring or indicating the turbidity of a liquid comprising a container for the liquid, reflecting means having portions arranged in opposed relation to each other in the container, means to admit a beam of light into the container for projecting an image onto one of the reflecting portions, the reflecting means and the beam of light being so positioned in relation to each other that the image is projected obliquely a plurality of times between opposed reflecting portions of the reflecting means, and means for observing the number of times said image is directed from one reflecting portion to another through said liquid.

2. Apparatus for measuring or indicating the turbidity of a liquid comprising a container for the liquid, reflectors on opposite sides of said container and slightly out of parallelism with one another, and a source of light adapted to form an image in one of said reflectors and means for observing the number of times said image is directed from one reflector to another through said liquid.

3. Apparatus for measuring or indicating the turbidity of a liquid comprising a rectangular container for the liquid, nearly parallel mirrors upon opposite sides of said container and each mirror having a transparent portion arranged substantially on the same horizontal level but laterally displaced relatively to one another, and a source of light adjacent to the transparent portion in one of said mirrors.

4. Apparatus for measuring or indicating the turbidity of a liquid according to claim 3 in which the source of light embodies a white opalescent screen through which the light is projected before passing through the transparent portion in the adjacent mirror.

In testimony whereof I have signed my name to this specification.

DANIËL JOHANNES MIDDENDORP.